(No Model.)
D. CONNELL.
CAR WHEEL.
No. 287,629. Patented Oct. 30, 1883.
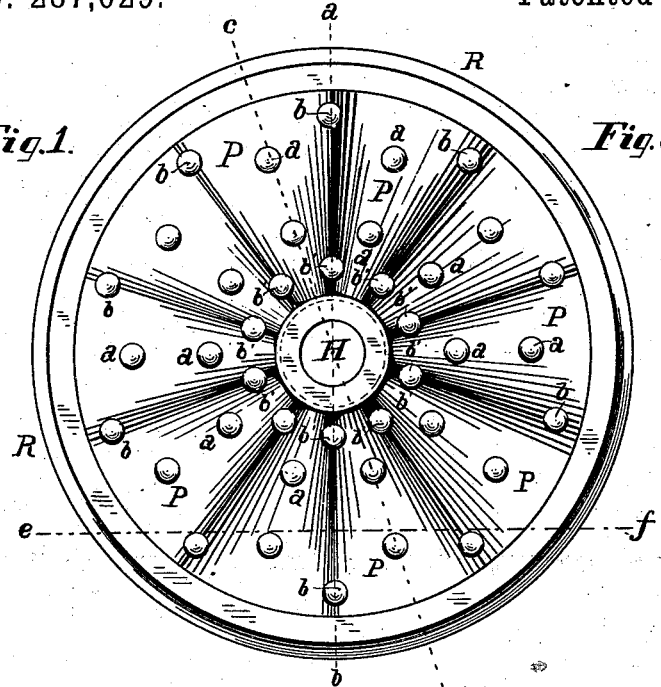
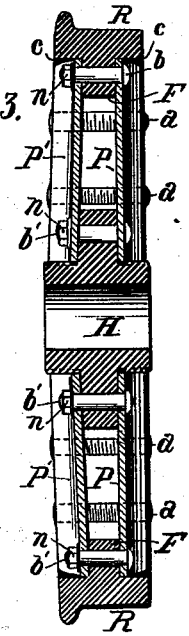
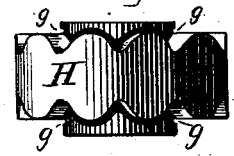
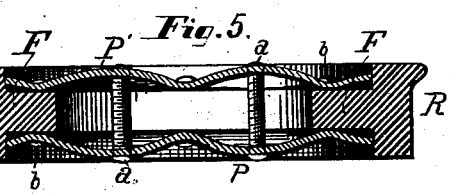
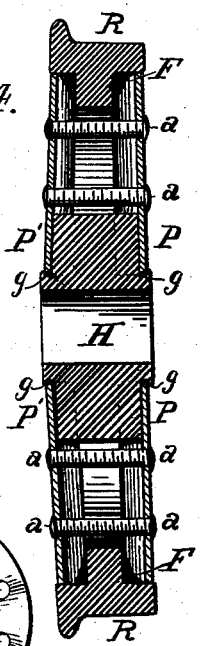
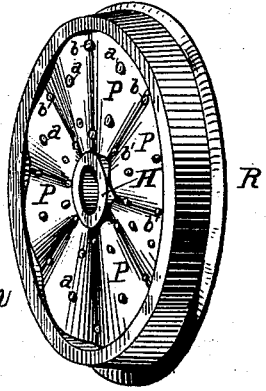
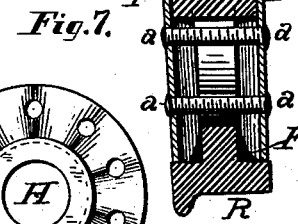
WITNESSES:
N. H. Cenhm
A. E. Baige
INVENTOR
David Connell,
per Joshua Pusey, atty.

UNITED STATES PATENT OFFICE.

DAVID CONNELL, OF WILMINGTON, DELAWARE.

CAR-WHEEL.

SPECIFICATION forming part of Letters Patent No. 287,629, dated October 30, 1883.

Application filed May 26, 1883. (No model.)

*To all whom it may concern:*

Be it known that I, DAVID CONNELL, a citizen of the United States, residing at the city of Wilmington, in the county of New Castle and State of Delaware, have invented certain new and useful Improvements in Car-Wheels, of which the following is a full, clear, and exact description, reference being had to the accompanying drawings, of which—

Figure 1 is a side elevation; Fig. 2, an oblique view; Fig. 3, a section on line $ab$; Fig. 4, a section on line $cd$; Fig. 5, a section on line $ef$, looking into the removed fragment; Fig. 6, an edge elevation of the hub detached, and Fig. 7 a side or end elevation of the same.

The same letters of reference where they occur in the several figures indicate the same parts.

This invention relates to that well-known class of car-wheels that are composed of separate rims and hubs connected rigidly together by means of plates secured to the rim or tire and to the hub; and it consists in the parts which will be hereinafter described, and pointed out in the claims.

The object of these improvements is to produce a composite car-wheel that shall combine in an eminent degree strength, lightness, firmness, and economy of construction.

Referring to the accompanying drawings, the rim or tire R of the wheel is made with an interior annular flange, F, whose sides, respectively, constitute a bearing for the plates P and P'. These plates are of steel or wrought-iron, preferably the former, are corrugated radially, as shown, and are secured together by means of threaded stay-bolts $a$ at the swells of the corrugations. They are also fastened firmly to the flange F of the rim by bolts $b$, and to the flange of the hub H by bolts $b'$, the plates and flanges being provided with holes suitably located to receive said bolts. These plates are arranged so that the swells of the corrugations of the one will be opposite those of the other, as seen in Figs. 3, 4, and 5. The sides of the flange of the hub, as seen more clearly in Fig. 6, are shaped to correspond with the contour of the plates P and P', where they rest against said flange. Plates P P' are connected together, and with the rim and hub, in the following manner, it being understood that the plates fit loosely in the space between the hub and the rim of the wheel: They are first laid in position, resting against the sides of the flanges of rim and hub. Then pressure is brought to bear, by means of apparatus which any skilled mechanic knows how to construct, upon the plates—that is to say, on the tops of the corrugations thereof—simultaneously. This results in a certain radial expansion of the corrugations, and a consequent forcing of the outer edges of the plates against the inner periphery of the rim contiguous to flange F, and the inner edges thereof against the outer periphery of the hub, thus increasing the rigidity of the connection between hub and rim. The connecting stay-bolts $a$, which I prefer to locate at about the relative distances from the rim and the hub, as shown in the drawings, are screwed into threaded holes in plates P P' while the latter are under the compression above mentioned, and may be subsequently headed or riveted, as seen. The bolts $b$ and $b'$ are now passed through the properly-aligned holes in the depressions of the plates and in the flanges of the rim and hub, respectively, and their nuts $n$ tightly screwed up.

I prefer to "crown" the inner of the plates, P', as seen in Figs. 3 and 4, in order to aid in resisting any side thrust to which the wheel may be subjected. For this purpose that side of the flange of the hub is beveled, as shown in those figures.

It will also be observed that a series of shallow grooves, $g$, are made on the side of the hub, corresponding to the indentations of the flange thereof. Their purpose is to lend some aid in securing the plates P P' to the hub by means of the edges of the plates becoming forced into said grooves when they (the plates) are compressed and so expand, as hereinbefore described. The corrugated plates P P', arranged and combined as described, practically form a series of hollow spokes of great strength and rigidity, connecting the rim of the wheel with the hub. I do not, however, confine myself to the precise arrangement shown as regards the relative positions of the corrugations, although, as stated, such arrangement is preferred.

Having thus described my invention, what I claim as new, and desire to secure by Letters Patent, is—

1. In a car-wheel, a hub provided with a circumferential flange having circumferential rugate sides and double circumferential rugate grooves, in combination with radial corrugated disks, the inner edges whereof are adapted to fit into the said rugate grooves and rest against the rugate sides of the hub-flange, and a rim or tire suitably secured to the disks, substantially as described, and for the purposes set forth.

2. The improved car-wheel resulting from the combination, with a rim having an inner annular flange and a hub having a circumferential flange, of the radially-corrugated plates, the swells of the corrugations of the one being opposite those of the other, said plates being bolted to the flanges of the rim and hub, respectively, and secured together and against the inner side of the rim by means of the bolts through the swells of the corrugations of said plates, the construction, combination, and arrangement being substantially as specified.

In testimony whereof I have hereunto affixed my signature this 24th day of May, A. D. 1883.

DAVID CONNELL.

Witnesses:
HENRY GARRETT,
J. C. FARRA.